United States Patent [19]
DeMichele

[11] Patent Number: 5,084,699
[45] Date of Patent: * Jan. 28, 1992

[54] IMPEDANCE MATCHING COIL ASSEMBLY FOR AN INDUCTIVELY COUPLED TRANSPONDER

[75] Inventor: Glenn A. DeMichele, Chicago, Ill.

[73] Assignee: Trovan Limited, Isle of Man

[ * ] Notice: The portion of the term of this patent subsequent to Apr. 30, 2008 has been disclaimed.

[21] Appl. No.: 400,600

[22] Filed: Aug. 30, 1989

Related U.S. Application Data

[63] Continuation-in-part of Ser. No. 358,310, May 26, 1989, Pat. No. 5,012,236.

[51] Int. Cl.$^5$ .......................... H04Q 1/00; H01F 5/00
[52] U.S. Cl. ..................... 340/825.54; 340/825.72; 343/867; 343/742; 336/182; 336/183; 336/184
[58] Field of Search ............ 340/825.54, 825.31, 340/825.34, 870.31, 870.32, 870.34, 870.35, 572, 825.72, 825.3; 343/867, 742; 324/207.18, 207.22, 207.26; 336/182, 183, 184, 125, 126

[56] References Cited

U.S. PATENT DOCUMENTS

| | | | |
|---|---|---|---|
| 3,859,624 | 1/1975 | Kriofsky et al. | 340/572 |
| 4,450,431 | 5/1984 | Hochstein | 340/870.31 |
| 4,630,044 | 12/1986 | Polzer | 340/825.72 |
| 4,658,263 | 4/1987 | Urbanski | 340/572 |
| 4,868,915 | 9/1989 | Anderson, III et al. | 340/825.72 |

Primary Examiner—Donald J. Yusko
Assistant Examiner—Peter Weissman
Attorney, Agent, or Firm—Rosenblum, Parish & Bacigalupi

[57] ABSTRACT

A coil assembly for use in an inductively powered transponder including a primary coil and a secondary coil wrapped around the same coil forming ferrite rod. The primary coil's leads are left floating while the secondary coil's leads are connected to the integrated identification circuit of the transponder. There are approximately three times as many turns to the primary coil as there are turns to the secondary coil. The primary coil is configured to self resonate at the operating frequency of the identification circuit when brought within range of an interrogator's magnetic field, thereby creating a voltage across the primary coil having a high source impedance. The secondary coil is configured to resonate at the same operating frequency, but to convert the high source impedance level of the primary coil to a low source impedance level, which is more suitable for powering the identification circuit and which substantially matches the impedance level of the secondary coil to the impedance level of the interrogator field, thereby maximizing the quantity of energy which can be transferred between the interrogator and the transponder.

32 Claims, 6 Drawing Sheets

IMPEDANCE MATCHING COIL ASSEMBLY FOR AN INDUCTIVELY COUPLED TRANSPONDER

This application is a continuation-in-part of copending application Ser. No. 358,310, filed May 26, 1989, entitled "Electromagnetic Energy Transmission and Detection Apparatus," assigned to the assignee of the present invention, and now U.S. Pat. No. 5,012,236.

BACKGROUND OF THE INVENTION

1. Field of the Invention

The present invention relates generally to inductively coupled electromagnetic energy field transmission and detection systems, such as a transponder in combination with an interrogation system, and more particularly to an impedance matching coil assembly for use in such a transponder.

2. Brief Discussion of the Prior Art

Many objects, such as houses, pets and cars, require some means of identification. Many prior art methods of identification have required visual interrogation of the identifying medium to extract the identification data, such as reading numbers on houses, license plates on cars, and collar tags or brands on animals. Electronic identification tags have also been created, which can be associated with the object and electronically communicated with at a distance, such as the electronic sensing and actuator systems shown in U.S. Pat. Nos. 3,732,465 and 3,752,960.

The systems described in those patents are comprised of an active element, having a single transmitting and receiving coil, which operates by transmitting an electromagnetic field within the proximity of a passive electrical circuit, thereby inductively coupling the coil with the passive circuit. The passive circuit operates to create a characteristic change in the transmitted electromagnetic field that can be detected by the electronics associated with the receiving coil and used to trigger some mode of operation for the system. Although such systems remove some of the restrictions associated with the previously described visual identification systems, such system are really nothing more than electronic keys, and actually convey less information to the active element than does a visually inspectable tag.

More sophisticated electronic systems use an exciter coil to transmit a high intensity electromagnetic energy field in the proximity of an electronic tag or transponder. The transponder is energized by the electrical energy inductively transferred by the transmitted magnetic field and is made operative to output a modulated identification signal which can be detected by an inductively coupled receiving coil proximately located at the exciter coil. The passive tag or transponder element of many of these devices, such as that described in U.S. Pat. No. 4,262,632, includes a coil which receives electromagnetic energy from a transmitted interrogation signal and retransmits an identification signal developed by the identification circuitry of the transponder. Electrical control circuitry within the transponder converts and rectifies the energy received from the coil and develops a dc power source for use in operating the transponder's identification circuitry.

Transponders which utilize a sufficiently large capacitor or resident power source, such as a battery, are able to transmit identification signals over fairly large distances, from a few yards to thousands of feet. However, in certain applications, such as identifying small animals, the size of the sealed packaging required to house the battery or capacitor may be too large for the intended use.

A great amount of effort has been expended to develop a truly passive transponder, which will do more than simply operate as an electronic key. A transponder which can be safely implanted within livestock and interrogated from a practical distance would help to reduce problems associated with certain regulations being implemented by the European Economic Community that will require all livestock to be separately identified.

One effort to create such a transponder resulted in the syringe-implantable transponder of European Patent No. 258,415. This patent and other related patented systems, such as U.S. Pat. Nos. 3,859,624, 3,689,885, 4,532,932 and 4,361,153, disclose passive elements which operate in real time and therefore do not require any type of significant energy storage means. The transmitting and receiving units of these systems, which are often referred to as interrogators or readers, typically include either a single, dual or triple coil arrangement, which is used to both transmit a high intensity electromagnetic field in proximity of the identification unit and receive an identification signal retransmitted by the transponder in proximity of reader coils of the interrogator.

The detection range of such systems is typically very restricted since the strength of the electromagnetic field produced by the transponder drops by $1/d^5$ at the receiver, where d is the distance between the receiving coil and the transponder coil, as the interrogator is moved away from the transponder. In fact, it has been calculated that at distances of 6 to 8 inches the strength of the magnetic field carrying the identification signal from the transponder, in devices similar to that described in the European Patent No. 258,415, is only an estimated one billionth the strength of the magnetic field carrying the interrogation signal to the transponder. Hence, the interrogator must normally be placed in very close proximity to the transponder in order for the identification signal to be detected. This limitation, of course, greatly restricts the utility of such devices, since not all objects may be so closely approached in order to be read.

Although the specification of European Patent No. 258,415 states that the system disclosed therein is operative to detect the retransmitted signal at distances on the order of inches, it has been found that devices constructed in accordance with that specification are actually incapable of obtaining such a range and are generally only effective when positioned within about an inch of the transponder. An identification device which is limited to operation within such a small range is of limited usefulness, especially when it is to be used to identify large or wild animals or other objects which cannot be readily approached. The problems with this system do not, however, so much rest with the encapsulation configuration or identification circuitry which is described in the patent and hereby incorporated for the purpose of describing the present invention, but rather in the manner in which the interrogator and transponder are coupled so as to transfer energy and information between one another.

Not only do these devices fail to provide for efficient coupling between the interrogator and transponder, the signals which are transmitted by the transponder and received by the interrogator are highly susceptible to interference and noise which severely affects the integrity of the detection portion of the system. This latter problem understandably increases in severity as the transponder is moved away from the interrogator, since it becomes more and more difficult to distinguish between the high intensity transmission field and the low intensity transponder field as the transponder field drops in strength.

Hence, a need has arisen for a transmission and detection system which can simultaneously transmit a high energy magnetic field, sufficient to power the transponder unit, and detect a localized retransmitted magnetic field at greater distances and with greater reliability. A need has also arisen for a transponder coil assembly for use in such systems which maximizes the quantity of energy which can be transferred by the inductive coupling between the identification circuitry and the interrogation and reception fields.

SUMMARY OF THE PRESENT INVENTION

It is therefore an object of the present invention to provide a novel electromagnetic field transmission and detection system which can simultaneously transmit a high intensity magnetic field and detect a localized low intensity magnetic field.

Another object of the present invention is to provide a novel electromagnetic field transmission and detection system which can accurately detect a localized low-intensity magnetic field in the presence of a high-intensity magnetic field, or other uniform electromagnetic interference or noise.

A further object of the present invention is to provide a novel electromagnetic field transmission and detection system which is capable of accurately detecting very low-energy magnetic fields within a range of at least 6-8 inches from the low-energy field transmission source.

A further object of the present is to provide a coil assembly which maximizes inductive coupling between the identification circuitry of a transponder and the magnetic fields of an interrogator.

Briefly, a preferred embodiment of the present invention comprises a coil assembly for use in an inductively powered transponder including a primary coil and a secondary coil wrapped around the same coil forming ferrite rod. The primary coil's leads are left floating (or detached) while the secondary coil's leads are connected to the integrated identification circuit of the transponder. There are approximately seven times as many turns to the primary coil as there are turns to the secondary coil. The primary coil is configured to self-resonate at the operating frequency of the identification circuit when brought within range of an interrogator's magnetic field, thereby creating a voltage across the primary coil having a high source impedance. The secondary coil is configured to resonate at the same operating frequency due to the coupling between the coils and to convert the high source impedance level of the primary coil to a low source impedance level, which is more suitable for powering the identification circuit and which substantially matches the impedance level of the secondary coil to the impedance level of the interrogator field, thereby maximizing the quantity of energy which can be transferred between the interrogator and the transponder.

These and other objects of the present invention will no doubt become apparent to those skilled in the art after having read the following detailed disclosure of a preferred embodiment which is illustrated in the several figures of the drawing.

DESCRIPTION OF THE PREFERRED EMBODIMENT

Figure 1:
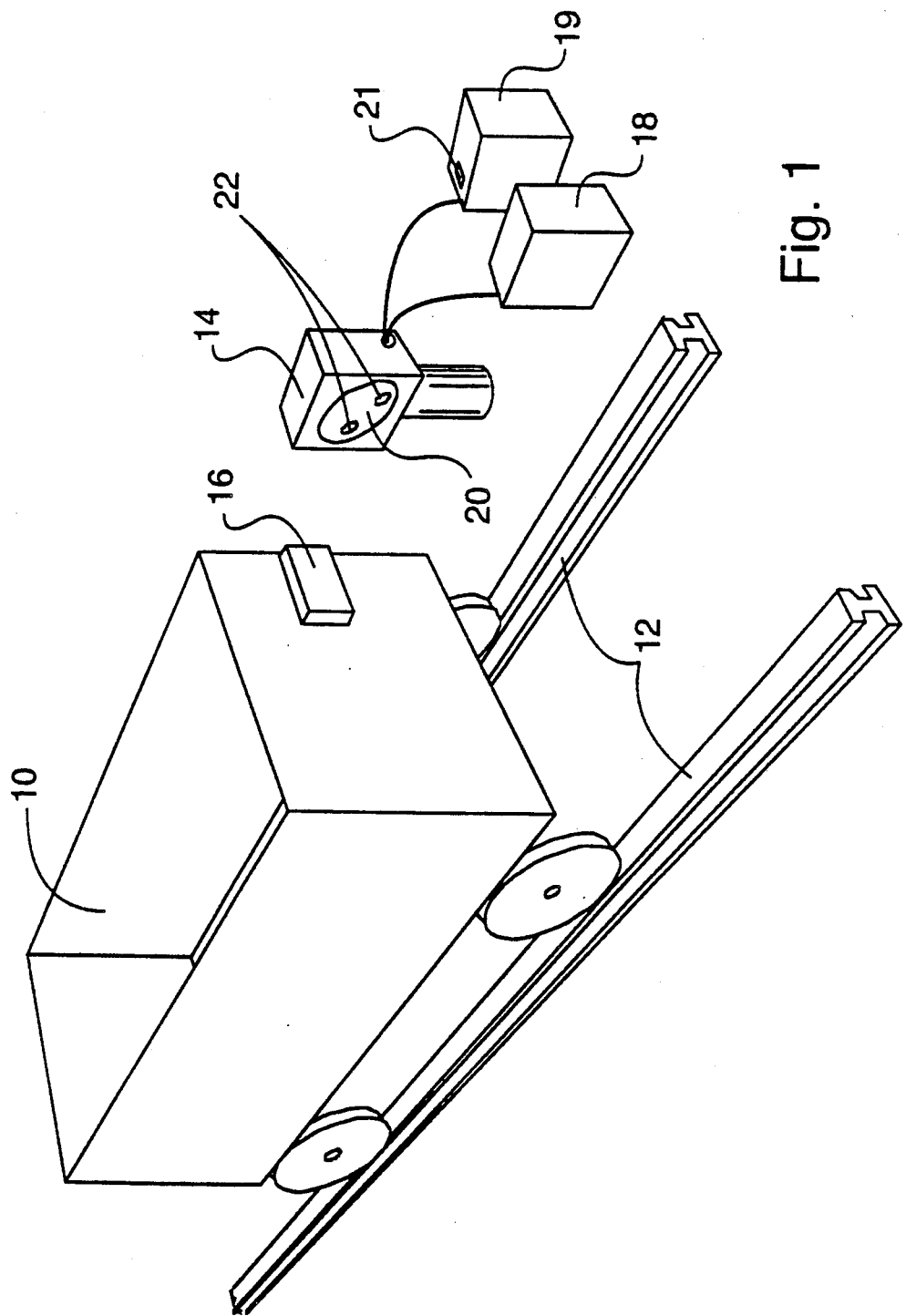
FIG. 1 is a partially-broken, perspective view of an application of an electromagnetic transmission and detection apparatus in accordance with the preferred embodiment of the present invention.

FIG. 1 illustrates a box car 10 travelling along rail lines 12 so as to pass along the front side of an interrogator or reader 14. Attached to the front of the box car is an identification box 16, which contains a data storage and transmitter device similar to those passive identification devices described in the prior art and having a coil assembly in accordance with the preferred embodiment of the present invention, which will be further described with subsequent reference to FIGS. 5 and 6.

This identification device is positioned so as to pass within close proximity of the reader 14, which contains a transmitter coil 20 for transmitting a high-intensity electromagnetic field to the identification box and two receiver coils, shown generally as 22, for receiving the low-intensity electromagnetic field retransmitted by the transmitter of the identification box 16. A generator 18 supplies power to the transmitter coil to produce the high intensity electromagnetic field. A display and storage device 19 receives the output of reader 14 for storage and display of the content of the identification signal contained therein at display 21.

It should be noted that although the reader 14 is shown in communication with a passive identification device for purposes of the present invention, the electromagnetic transmission and detection apparatus of the present invention could be utilized in any of a number of applications where it is necessary to accurately detect a low-intensity electromagnetic field in the presence of uniform high-intensity electromagnetic fields.

The operation of the reader 14 may be better illustrated with reference now to FIG. 2, which illustrates transmitter coil 20 and the two differential receiver coils 22 of the preferred embodiment of the present invention. The number of windings utilized to create these coils, as well as the shape of the coils, can vary significantly. In general, the coils are substantially polygonal in shape, wherein a polygon is defined to mean a figure having many sides and a circle is assumed to be comprised of numerous straight lines rather than a true circle. Hence, the windings of the coils circumscribe a substantially polygonal volume of space, and the large outer transmitter coil 20 of the reader is generally comprised of about 20 turns of copper wire 24 wound in a polygonal manner so as to create a coil having a diameter, or polygonal diameter, of about 5 to 6 inches.

In all embodiments, the transmitter coil 20 and differential receiver coils 22 are ordinarily affixed to a suitable nonconductive support structure so as to be positionable as shown in FIG. 1. Support surfaces, such as the type required to support the coils of the present invention, are well known in the art, i.e., hand-held pistol-shaped scanner structures and wand-like antennas or scanner structures, and can be constructed so as to support the coils in any of a large number of different configurations. As will be noted below, many of the alternative embodiments of the present invention will require a support structure constructed in a manner different than that depicted in FIG. 1. In this regard, it is only important to note that the support should be constructed from such a material and in such a manner so as to not significantly interfere with the passage of electromagnetic energy to or from the coils.

When sufficient power is supplied to the transmitter coil 20, such that there is more electrical energy present in the coil than can be dissipated by the resistance of the coil, substantially toroidal-shaped electromagnetic energy fields, such as the flux fields 26 and 28, will be produced. Although the electromagnetic flux fields 26 and 28 are three-dimensional in nature, circumscribe the polygonal volume of the transmitter coil, and are not bounded within the defined limits depicted in FIG. 2, these electromagnetic flux fields will be illustrated by dashed lines 26 and 28 for the sake of simplicity. It should also be noted that the basic shape of the electromagnetic flux fields will be varied depending on the positioning of the differential receiver coils 22 with respect to the transmitter coil 20, as further described below.

When a passive identification device, such as the transponder assembly 30 of the identification box 16 is within the transmission and power range of the transmitter coil 20, some of the energy contained within the transmission fields will be transferred to the transponder assembly 30 through inductive coupling. The voltage extracted by the transponder's receiving coil (not shown in FIG. 2, but shown in FIG. 5) from the transmission field can then be used to power the electronic identification circuitry of the transponder, and in turn cause a modulated identification signal (in the form of current) to flow back through the coil of the transponder. Since the quantity of energy created by means of the inductive couple is small, and a certain quantity of that energy is utilized to operate the electronic circuitry of the transponder, the transponder coil is only capable of retransmitting a very low-intensity electromagnetic field of a highly localized nature.

As discussed above with reference to the description of the prior art, the overall operation of the transponder and its electrical circuitry are well known in the art and are described in sufficient detail in some of the prior art references referred to above. However, the coil assembly of the transponder assembly 30 differs significantly from the prior art and will be described in detail with subsequent reference to FIGS. 5 and 6.

Figure 3:
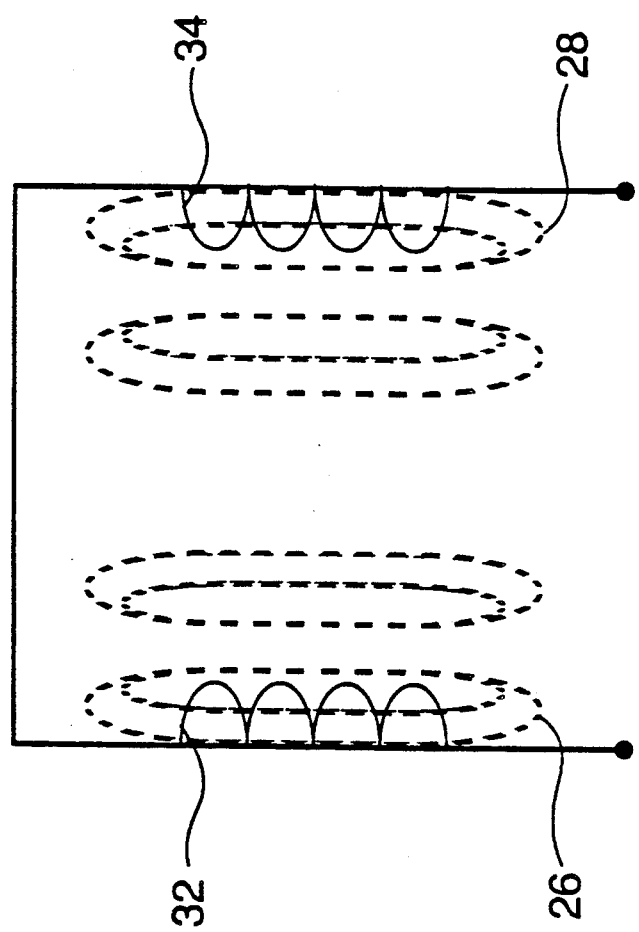
FIG. 3 is a diagram schematically illustrating the differential circuit relationship of the receiving coils of the apparatus in accordance with the preferred embodiment of the present invention.

The differential receiver coils 22 are comprised of two substantially polygonal coils 32 and 34, which are electrically connected to one another in a differential circuit relationship such that the electrical signals induced within the coils by electromagnetic energy are subtracted from one another so as to form a differential output signal. A schematic illustration of the differential coils 22 is illustrated in FIG. 3.

Receiver coils 32 and 34 are disposed within the volume space of the transmitter at significantly separated points. Preferably, the receiver coils and the transmitter coil are co-planar and the receiver coils are disposed in diametrically opposite positions. Since the receiver coils are positioned within the volume space of the transmitter coil, both receiver coils share a linking relationship with the flux fields 26 and 28. It is preferable to have the receiver coils diametrically opposed so that there is assurance that the receiver coils will be linked with substantially identical portions of the flux field, so that when the output of the receiver coils are subtracted, the difference will be close to zero.

It is also desirable to separate the receiver coils by some significant distance so that both receiving coils will not receive equally intense transmissions from the transponder. Since the strength of the transponder field drops off at the rate of $1/d^5$, separating the receiver coils will help to assure that the energy of the transponder field is primarily only received by one receiver coil. Naturally, the differential receiver coils will work if disposed in positions that are not diametrically opposed, and therefore not separated by as large of a distance. Thus, as long as the receiver coils are not positioned adjacent to one another, there should be some significant difference in the energy received by each receiver coil from the transponder.

It should also be noted that because of the related positions of the receiver coils, both coils would also generally receive approximately equal levels of substantially uniform interference energy created by other nearby transmission sources. The positioning of the receiver coils 22 within the transmitter coil 20 is an important aspect of the present invention, in that it allows the presence of the substantially equal and opposite transmission fields, together with other substantially uniform magnetic fields, to be cancelled by the differential nature of the two coils. Hence, by differentially electrically connecting the receiver coils so as to subtract the output signals of the individual coils from one another, it is possible to produce a combined output signal which has a near zero voltage amplitude when the two coils receive approximately equal quantities of energy, and a maximum voltage amplitude when one of the coils receives more energy from an electromagnetic field than does the other receiver coil.

Alternatively, it may also be desirable in some instances to modify the range or area covered by the transmission and detection fields of the reader 14. Possible methods of doing this would be to modify the shape or physical configurations of the receiver coils, move the receiver coils away from the plane of the transmitter coil, or rotate the receiver coils by some angle, such that their central axes are no longer parallel to the Y-axis of the transmitter 20.

It is important to note, however, that when the receiver coils or the receiver coils position's are modified in any such manner, the electrical symmetry of the reader system must be maintained such that more of the energy of the transponder field can be intercepted by one receiver coil than the other receiver coil, or else the differential coils will not be able to accurately detect the presence of the transponder. It is also important to note that in the event that modifications cause the receiver coils to be linked with flux fields of different or variable intensities, the physical or electrical characteristics of the receiver coils can correspondingly be modified, such that even if the receiver coils are not symmetrical with respect to the energy received, the differential output signal can still be zero when both coils are exposed to substantially uniform fields.

Figure 2:
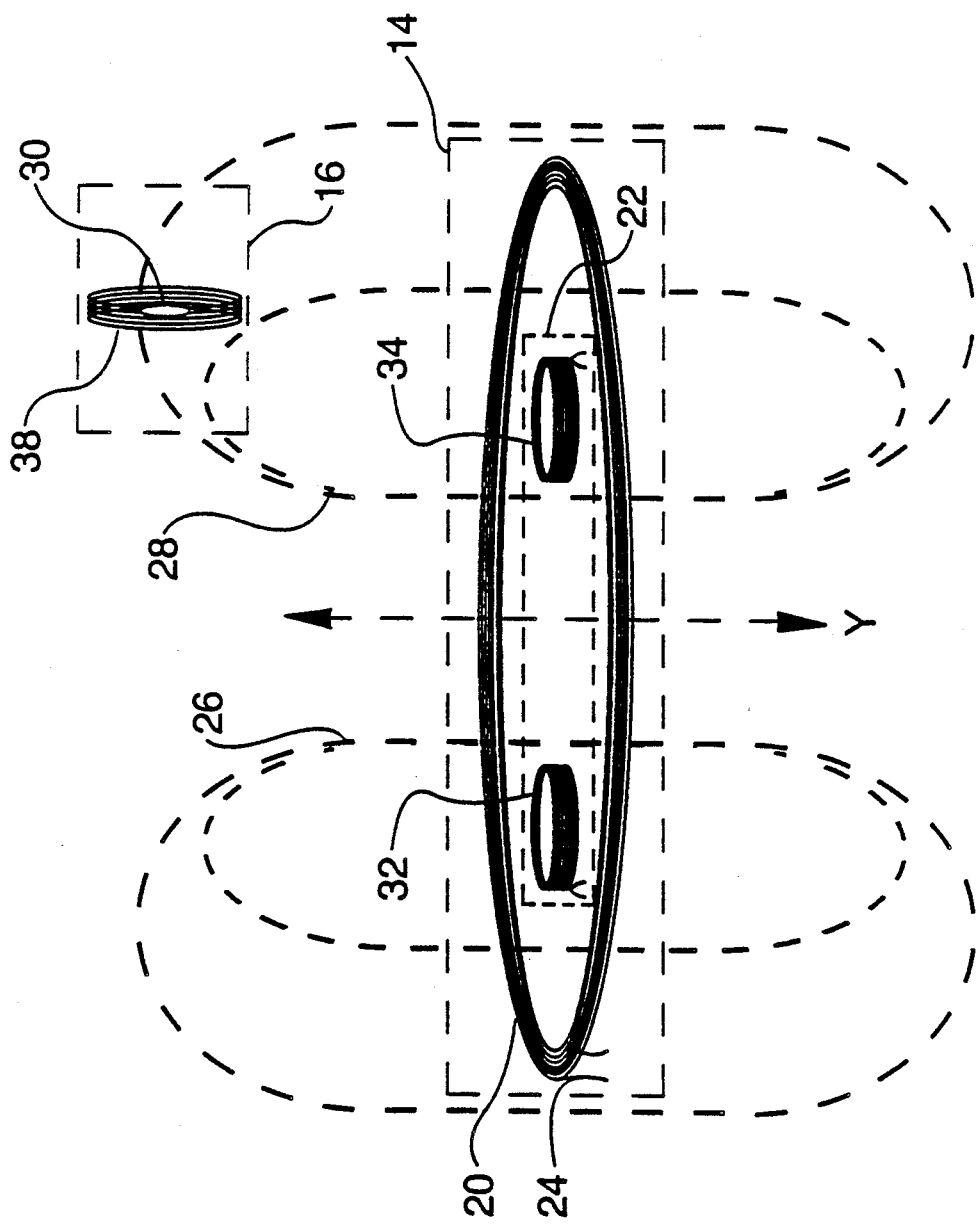
FIG. 2 is a partially-broken, perspective view of the transmission coil and receiving coils of the apparatus of FIG. 1 in accordance with the preferred embodiment of the present invention.

When the reader is configured as shown in FIG. 2, it is known that the reader 14 can accurately detect the presence of the transponder 30 at distances of up to at least 8 inches away. Once again, this increase in detection range over the prior art relates to the reader's ability to cancel out the relative presence of all but the transponder field when that field is primarily detected by only one receiver coil. The ability of the reader 14 to detect the transponder assembly 30 at such distances is also enhanced through usage of the coil assembly of the preferred embodiment of the present invention, as will be described below.

With reference to the particular arrangement of the various coils depicted in FIG. 1, the transponder 30 is positioned so as to receive the magnetic field generated by the transmitting coil 20. As previously stated, the strength of the electromagnetic field 38 retransmitted by the transponder is so small that it is effectively incapable of being detected by the transmitter coil. The transponder field 38 is, however, within the detectable range of the receiving coil 34. This is true because when the difference between the output of coil 32 is taken from the output of coil 34, the amplitude of the combined output signal will be greater than zero volts by an amount which corresponds to the energy transferred by field 38, thereby indicating the presence of the transponder and allowing for detection of the modulated identification signal contained within the field 38. In other words, the placement of the two receiver coils within the cylindrical volume of space of the transmission coil creates a high sensitivity to the transponder field and a low sensitivity to the transmitter field.

In order to be sensitive to the small transponder field, the receiver coils 32 and 34 should be formed from a sufficiently large number of turns of wire, i.e., 600 turns, so as to be more sensitive to the transponder field than the transmitter coil. The polygonal diameter of the two receiver coils should also each be smaller than the diameter of the transmitter coil, although this is not an absolute requirement if electrical symmetry is maintained. In the preferred embodiment, the receiver coils 22 are each approximately 20% of the diameter of the transmitter coil. Hence, when the diameter of the transmitter coil is 5-6 inches, the diameter of the receiver coils should be approximately $\frac{3}{4}$ to $1\frac{1}{4}$ inches.

Figure 4:
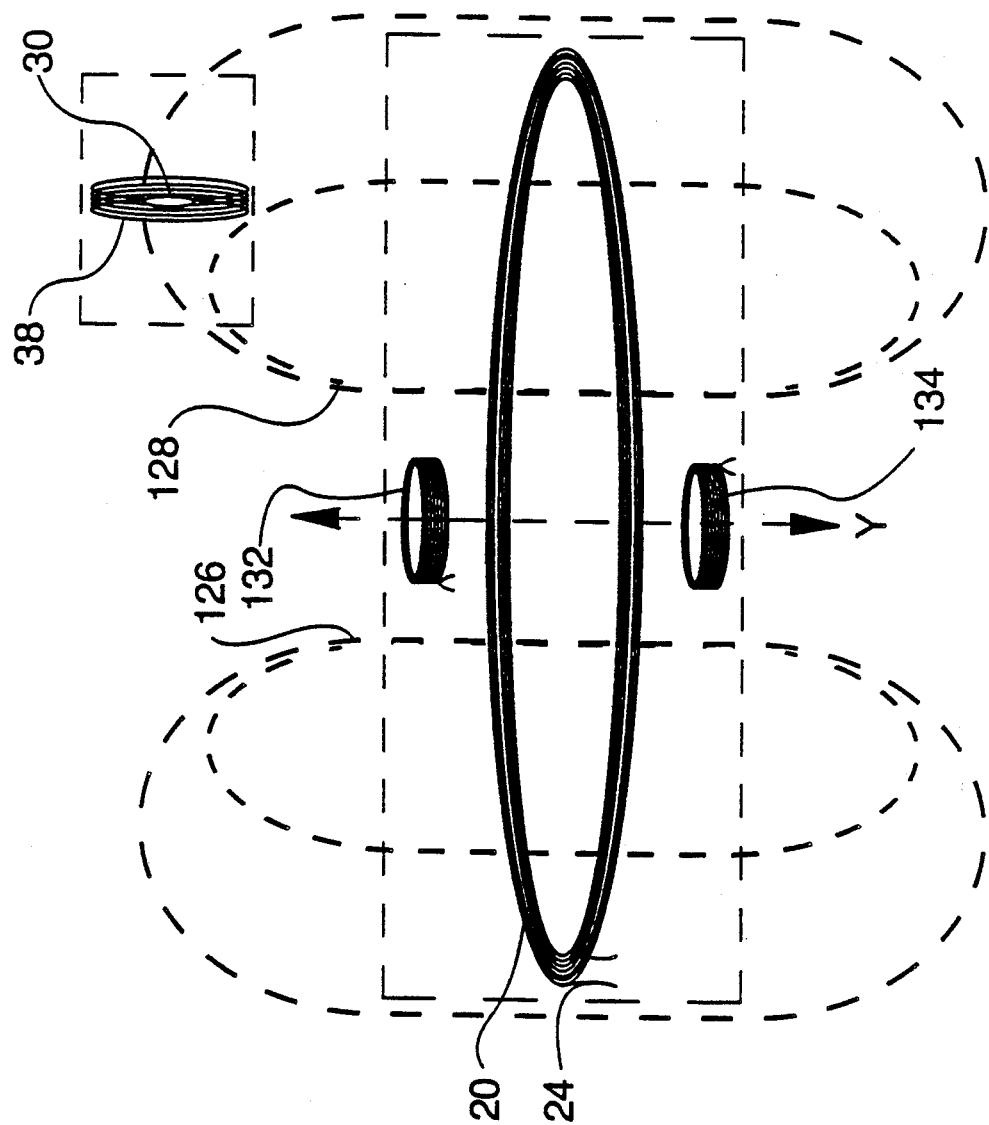
FIG. 4 is a partially-broken, perspective view of an alternative embodiment of the transmission coil and receiving coils of the present invention.

An alternative embodiment of the present invention is depicted in FIG. 4, in which the two receiving coils 132 and 134 are more or less placed on top of one another, so as to be substantially, coaxially positioned along the central axis of the transmitting coil 20. Since the transponder 30 can only be located on one side of the transmitting coil 20 at any one time, the energy of the transponder field 38 will generally only induce an electrical signal in one of the receiving coils and not the other. Because of the substantially symmetrical positioning of the receiving coils 132 and 134 about the transmitter coil 20, the receiving coils will link with substantially identical portions of the flux fields 126 and 128. Hence, the differential coil effect of the two receiving coils will allow the low intensity magnetic field of the transponder to be detected despite the presence of the high intensity transmitter fields.

It is anticipated that the two receiving coils of the present invention could also be shaped, disposed and oriented in a number of other shapes and positions within the volume space of the transmitter coil and achieve the differential detection effect described in reference to the preferred and alternative embodiments.

Although the differential receiving coils 22 of the present invention can extend the range over which the transponder assembly's signals can be detected, this range can be further extended, or at least maintained, if the strength of the transponder field 38 is increased. With regard to the present invention, it has been found that maximizing the power coupling between the transmitting coil 20 and the transponder assembly 30 also maximizes the power coupling between the transponder assembly 30 and the receiver coils 32 and 34. By maximizing the power coupling between the transmitting coil and the transponder, more energy can be collected by the coils of the transponder assembly 30, thereby resulting in a significant increase in the strength of the retransmitted transponder field 38, which in turn can be more readily detected because of the increased efficiency of the power coupling between the transponder and the receiver coils.

The strength of the transponder field 38 is increased as a result of the reciprocal relationship which typically exists between a coil and a coupled magnetic field. If a coil produces a current in the presence of a magnetic field, that same magnetic field will be produced by that coil when the same level of current is forced through it. Given that the inductance of a coil is calculated as the ratio of the magnetic flux density surrounding the coil to the current flowing through the coil, and maximizing the power collected by the coil in a given magnetic field maximizes the strength of the magnetic field produced by the coil when driven by that same power, then maximizing the inductance of the coil will likewise maximize the linkage between the coil and the magnetic field.

Figure 5:
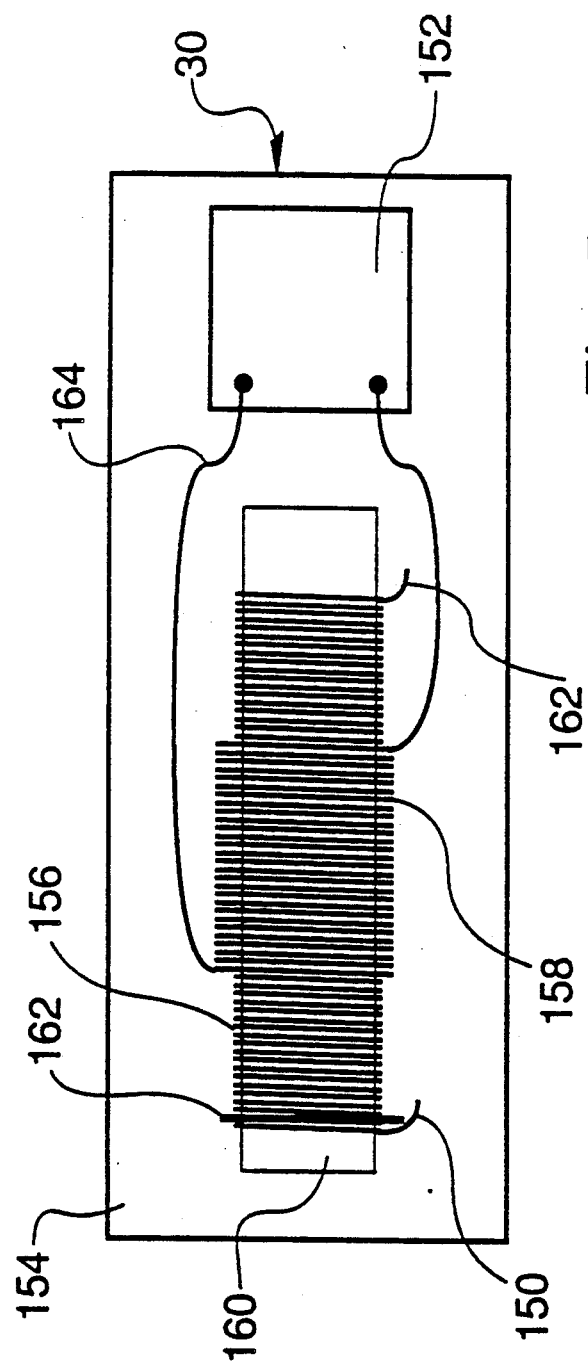
FIG. 5 is plan view of a transponder assembly in accordance with the preferred embodiment of the present invention.

This latter principle can be better explained now with reference to FIG. 5, which depicts a plan view of the transponder assembly 30 including a coil assembly, shown generally as 150, in accordance with the preferred embodiment of the present invention. FIG. 5 also depicts an electronic identification circuit assembly 152, which as previously stated may be of a type well know in the prior art and which need not be explained here for a full understanding of the present invention. The coil assembly 150 and the circuit assembly 152 are both mounted on a substantially nonconductive support member 154.

As depicted in FIG. 5, coil assembly 150 is comprised of a primary coil 156 and a secondary coil 158. The primary coil 156 is wound around a ferrite rod core 160 with approximately 3,800 turns of 54-gauge- insulated wire. The core 160 is approximately 0.038 inches in diameter and 0.312 inches in length. In prior art transponders, the corresponding component to the coil assembly 150 would be entirely comprised of the core 160 and the primary coil 156, which would have its leads 162 connected to the circuit assembly 152. In the present invention, however, the coil assembly 150 also includes the secondary coil 158, which instead has its leads 164 connected to circuit assembly 152 while the leads 162 of the primary coil are neither connected to the circuit assembly nor to the secondary coil. In other words, the leads 162 of the primary coil 156 are left floating or "open-circuited". This secondary coil 158 is formed from approximately 500 turns of a separate length of the same type of wire that is used for the primary coil 156. The correlation between the ratio of the number of turns in the primary coil to the number of turns of the secondary coil will be further explained below.

In any inductor, such as the primary coil 156, stray capacitance will generally be present between the turns of the inductor. This inter-turn capacitance appears across the inductor and creates a parallel resonant circuit with its own inductance. Because the turn-to-turn capacitance resonates with the coil's own inductance, the coil is said to be self-resonant. It is known in the prior art to tune a coil to self-resonate at the frequency of the transmitter field because doing so helps to maximize the energy which can be derived from that field. However, prior art transponder systems have all used an additional capacitor in combination with the primary coil in order to bring the resonance of the coil down to the self-resonate frequency of operation. Although use of this additional capacitor makes the primary coil self-resonant, the physical size of the capacitor makes the transponder too large for implantation purposes.

Because self-resonant coils can efficiently transfer power from an external field to an electronic circuit, they are extensively used in electronic communication technologies. As used in prior art transponders, however, the resulting voltage signal produced by the coil can often be too large for its intended use, and the coil must be lightly loaded in order to remain self-resonant. To maintain a light load on the coil, the amount of current induced in the coil must be kept rather small. This small current in combination with the large impedance and inter-turn capacitance of the coil generally results in a larger than desired voltage (in excess or 40 volts) appearing across the parallel resonant circuit. Although this voltage may be divided down, the current level often remains marginal and is therefore sometimes too small to drive the circuit assembly 152.

This problem is solved in the present invention through use of the detached primary coil 156 in combination with the secondary coil 158, which serves to transform the impedance of the primary coil to a more useful level. The secondary coil 158 is generally wrapped around the rod 160 after the formation of the primary coil 156, but could also be formed before or coincident with formation of the primary coil, since the manner in which the coils are formed does not significantly effect the electrical interaction between them. Regardless of which is wound first, the ferrite core 160 should generally be coated with a thin layer of insulating material to prevent abrasion and subsequent shorting of the insulated wire of the coils.

As previously stated, the resonant field which is created in the primary coil 156 results in a substantial voltage across the primary coil leads 162. Since this voltage level is significantly above that required to operate the circuit assembly 152, typically a CMOS variety integrated circuit requiring only 2 to 5 volts, the voltage must be divided down before being applied to the integrated circuit. Dividing the voltage down creates a significant disadvantage because it requires additional space consuming electrical components and creates heat which must be dissipated to keep the transponder from overheating and irritating the animal in which it is implanted.

An important aspect of the present invention is that the square of the ratio between the turns of the primary coil 156 and the secondary coil 158 serves to create a proportional change between the impedance of the primary coil and the secondary coil. For example, if the number of turns of the secondary coil 158 is the same as the number of turns of the primary coil 156 (i.e., a 1:1 ratio), the secondary coil will have the same impedance as the primary coil. Whereas, if the secondary coil 158 has fewer turns than the primary coil 156, so as to create for example a 2:1 or 7:1 ratio between them, the voltage across the secondary coil will be stepped down, decreased, and the current flowing through the secondary coil will be stepped up, increased, by an amount proportional to the ratio of turns in the coils. Since the impedance of a signal is calculated as the ratio between the voltage to the current in the signal, reducing voltage and increasing the current lowers the impedance of the secondary coil 158.

A desirable effect of this impedance transformation is that it makes the low load impedance of the electronics look like a high impedance to the primary resonant circuit, thereby allowing a light load to be maintained on the primary coil. Theoretically, this impedance matching effect could be created by a transformer or by connecting an inductor in parallel with a capacitor, theories which are often used in radio frequency receivers and amplifiers, but which would not be desirable in the present invention because of the physical size of such additional components.

In the preferred embodiment of the present invention, since the primary coil is comprised of 3,800 turns and the secondary coil is comprised of 500 turns, the 40 volts created across the primary coil can be approximately stepped down by a factor of 7, or to about 6 volts, which is the maximum operating voltage of the CMOS integrated identification electronics. Since the voltage levels will decrease proportionally as the transponder assembly 30 is moved away from interrogator 14 (FIGS. 1 and 2) and the identification electronics circuit will operate down to about 1.8 volts, the transponder assembly can be moved a substantial distance from the interrogator 14 and still remain operational.

Just as the primary coil 156 is tuned to resonate with the frequency of the transmitting field 38, the secondary coil 158 appears to resonate at the operating frequency of the identification circuit assembly 152 due to the coupling between the coils, so as to reduce the loss of power when the two devices are interfaced. Although the coil assembly 150 is optimized to receive the electromagnetic field 38 (FIG. 2) of the interrogator 14 and to convert the energy within that field into sufficient power for operation of the identification circuit assembly 152, the coil assembly 150 is also configured to enhance retransmission of the identification signal from the transponder assembly 30 to the interrogator 14. This enhancement has a significant impact on the utility of the coil assembly 150 because even the smallest increase in that amplitude significantly increases the detectable range of that signal and the range of the transponder's operation.

Figure 6:
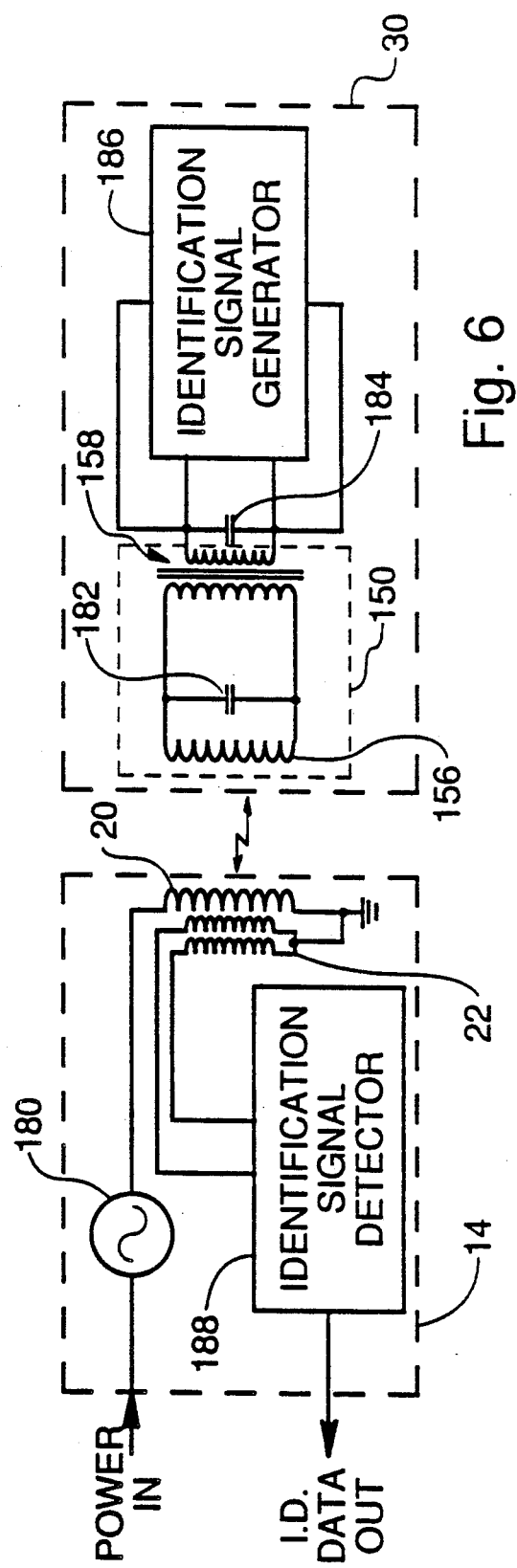
FIG. 6 is a diagram schematically illustrating the relationship between the interrogator and the transponder, as well as the simplified electronic equivalent circuit for the transponder in accordance with the preferred embodiment of the present invention.

FIG. 6 schematically illustrates the relationship between the interrogator 14 and the transponder assembly 30. FIG. 6 also includes in dashed lines 170 the additional elements that, when combined with the coils 156 and 158, would form an equivalent circuit for the coil assembly 150. It should be noted that coil assembly 150 is illustrated as an equivalent circuit to convey information regarding the electrical implementation of the present invention. Electrical connections appearing between the primary and secondary coils, as well as the additional components shown in dashed lines within that assembly, should be understood to not actually exist in the physical embodiments of the present invention.

As depicted, the interrogator 14 is comprised of a signal generator 180 which receives POWER IN from an external source and generates an interrogator signal for transmission to the transponder 30 through the transmitting coil 20. The electromagnetic field produced by current flow through the transmitting coil 20 is received by the primary coil 156 of the coil assembly 150. Through the inter-turn capacitance 182 (shown here as a separate component for illustration purposes only) of the primary coil 156, an induction power field is radiated by the primary coil and received by the secondary coil 158. Although the primary coil 156 and the secondary coil 158 are shown to be physically connected, it is once again to be understood that these two coils communicate through an induction power field and not physical wiring.

The net effect of the secondary coil 158 in combination with the primary coil 156 is that of a transformer, which is why it is shown as such at 184 in FIG. 6. As described above, the secondary coil 158 and its inter-turn capacitance 186 transform or converts the impedance level of the energy transmitted by the primary coil 156 to an acceptable impedance level for use in driving the identification signal generator (circuit assembly) 152.

The identification signal generator 152 is operative to detect the presence of the interrogator signal output by the secondary coil 158 and to output an identification signal for retransmission by coil assembly 150 back to the receiver coils 22. The receiver coils detect the presence of the identification signal within the differentiated transmitting field and output the identification signal to the identification signal detector 188, which analyses the data within the signal regarding the identification of the transponder 30 and outputs an IDENTIFICATION (I.D.) DATA OUT signal for display or storage.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

I claim:

1. A transponder coil assembly for disposition in a transmitted electromagnetic field and operative to transfer power derived from the electromagnetic field to an associated integrated circuit device in electrical communication with the coil assembly, comprising:
   a magnetic core;
   first coil means including a first length of wire wound about said core and having a first predetermined number of turns, the ends of said first length of wire being open-circuited such that said first coil means and its interturn capacitance form a resonant circuit operative to convert energy within said field into inductive power at a first impedance level; and
   second coil means including a second length of wire wound around said core and inductively coupled to said first coil means, said second coil means being operative to convert said inductive power into an electrical power signal at a second impedance level and to output said power signal to an integrated circuit device connected across the ends of said second length of wire.

2. A transponder coil assembly as recited in claim 1, wherein said second number of turns is substantially fewer in number than said first number of turns.

3. A transponder coil assembly as recited in claim 2, wherein the square of the ratio of said first number of turns to said second number of turns is proportional to the ratio of said first impedance level to said second impedance level.

4. A transponder coil assembly as recited in claim 3, wherein said first impedance level is at least six times greater than said second impedance level, whereby the voltage of said inductive power is stepped down and the current of said inductive power is stepped up when said inductive power is converted to said power signal.

5. A transponder coil assembly as recited in claim 1, wherein said field is transmitted to said coil assembly at a first frequency, and wherein said first coil means is operative to self-resonate at said first frequency so as to maximize the quantity of energy derived from said field and converted by said first coil means into said inductive power.

6. In a transponder having an integrated identification circuit device in electrical communication with a coil assembly that is wrapped about a magnetic core and is operative to be inductively coupled to a transmitter by an electromagnetic field, and is further operative to transfer power derived from the field to the circuit device, an improved coil assembly comprising:
   first coil means including a first length of conductive wire disposed in winding relation around said core and having its ends open circuited, said first coil means being operative to inductively couple with said electromagnetic field and convert the energy within said electromagnetic field into an induction power field having a first impedance level; and
   second coil means including a second length of conductive wire disposed in winding relation around said core and having its ends coupled to said circuit device, said second coil means being operative to receive said power field, to convert the energy in said power field into an electrical power signal having a second impedance level, and to output said power signal to said circuit device through its coupled ends, whereby the power transferred to said circuit device is at said second impedance level.

7. An improved coil assembly as recited in claim 6, wherein said first length of wire includes a first number of turns disposed in winding relation around said core, and said second length of wire includes a second number of turns substantially fewer in number than said first number of turns and disposed in winding relation around said core, and further wherein the square of the ratio of said first number of turns to said second number of turns is proportional to the ratio of said first impedance level to said second impedance level.

8. An improved coil assembly as recited in claim 7, wherein at least a six to one ratio exists between said first impedance level and said second impedance level.

9. An improved coil assembly as recited in claim 7, wherein said field is transmitted to said coil assembly at a first frequency, and wherein said first coil means is operative to self-resonate at said first frequency so as to maximize the quantity of energy derived from said field and converted by said first coil means into said power field.

10. An improved coil assembly as recited in claim 6, wherein said electromagnetic field is transmitted to said coil assembly at a first frequency, and wherein said first coil means is operative to self-resonate at said first frequency so as to maximize the quantity of energy derived from said electromagnetic field and converted by said first coil means into said power field.

11. A method for matching the impedance coupling between a transponder and an electromagnetic field generated proximate the transponder, the transponder including an integrated identification circuit device in electrical communication with a coil assembly having a central core and primary and secondary coils each disposed in winding relation around the core, the coil assembly being operative to transfer power derived from the electromagnetic field to the circuit device, comprising the steps of:

receiving said electromagnetic field with a first length of conductive wire having open-circuited ends and forming said primary coil;
 converting the energy in said electromagnetic field into an induction power field having a first impedance level;
 receiving said power field with a second length of conductive wire forming said secondary coil and having its ends coupled to said circuit device;
 converting said power field into an electrical power signal having a second impedance level which substantially matches the impedance level of said electromagnetic field; and
 transferring said power signal to said circuit device, whereby the quantity of energy transferred from said electromagnetic field to said circuit device is maximized by matching said second impedance level with said first impedance level.

12. A method for matching the impedance coupling between a transponder and an electromagnetic field generated proximate the transponder as recited in claim 11, wherein said field is transmitted to said transponder at a first frequency, and wherein said step of converting the energy in said field includes the step of tuning said first coil to self-resonate at said first frequency.

13. An electronic identification system for transmitting a high intensity electromagnetic field within the proximity of a transponder coil assembly inductively coupled to the high intensity field, the transponder coil assembly being operative to transfer power derived from the high intensity field to an integrated circuit device in electrical communication with the coil assembly and to retransmit a low intensity electromagnetic field which is detected by the identification system, comprising:

a transmission and detection apparatus for transmitting said high intensity field and detecting the presence of said low intensity field emanating from said transponder coil assembly despite the presence of said high intensity field; and
 a transponder coil assembly, including:
  a core;
  first transponder coil means including a first length of wire disposed in winding relation around said core and with its ends open-circuited, and operative to receive said high intensity field and to convert the energy within said high intensity field into an induction power field having a first impedance level; and
  second transponder coil means disposed in winding relation around said core and operative to receive said power field, to convert the energy is said power field into an electrical power signal having a second impedance level, and to output said power signal to said integrated circuit device, whereby the power transferred to said circuit device is at said second impedance level and is sufficient to induce said circuit device to produce an identification signal for retransmission by said transponder coil assembly to said transmission and detection apparatus.

14. An electronic identification system as recited in claim 13, wherein said transmission and detection apparatus includes:

a support means;
 means for generating a first electrical signal for use in creating said high intensity field;
 a transmitter coil affixed to said support means for receiving said first electrical signal and transmitting said high intensity field, said transmitter coil including one or more conductive windings circumscribing a substantially polygonal volume of space having a central axis, said transmitter coil being adapted to generate a magnetic flux field within said volume;
 first and second receiver coils disposed within said volume of space at significantly separated points and adapted to have linking relationships with portions of said flux field, said first and second receiver coils being electrically connected to each other in a differential circuit relationship such that the magnitude of electrical signals induced in said first and second receiver coils by electromagnetic energy transmitted by said transmitter coil are substantially equal and opposite to each other, whereby electromagnetic energy generated by said coil assembly and passing through at least one of said first and second receiver coils will induce an electrical signal of greater magnitude in one receiver coil than will be induced in the other receiver coil and cause a current to flow in said differential circuit which corresponds to the energy generated by said coil assembly; and
 means responsive to said current flowing in said differential circuit and operative to indicate a measure of the energy generated by said external source, whereby said integrated circuit device in communication with said coil assembly is remotely detected and identified.

15. An electronic identification system as recited in claim 14, wherein said portions of said flux field varies in intensity at said significantly separated points, and wherein said first and second receiver coils electrically compensate for variations in the intensity of said flux field.

16. An electronic identification system as recited in claim 14, wherein said first and second receiver coils are substantially identical in shape and have linking relationships with substantially identical portions of said flux field.

17. An electronic identification system as recited in claim 14, wherein said first and second receiver coils and said transmitter coil are substantially co-planar.

18. An electronic identification system as recited in claim 14, wherein said first and second receiver coils are disposed within said volume of space at substantially diametrically opposed points.

19. An electronic identification system as recited in claim 14, wherein said first and second receiver coils are each more sensitive to said low-intensity field than said transmitter coil.

20. An electronic identification system as recited in claim 14, wherein said first receiver coil includes one or more conductive windings circumscribing a first substantially polygonal volume of space having a first central axis, and wherein said second receiver coil includes one or more conductive windings circumscribing a second substantially polygonal volume of space having a second central axis.

21. An electronic identification system as recited in claim 20, wherein first central axis and said second central axes are substantially parallel to said central axis of said transmitter coil.

22. An electronic identification system as recited in claim 21, wherein said first central axis and second central axis are equidistant from said central axis of said transmitter coil.

23. An electronic identification system as recited in claim 20, wherein said first central axis and said second central axis are substantially co-axial.

24. An electronic identification system as recited in claim 20, wherein said first and second polygonal volumes of space are each smaller than said polygonal volume of space of said transmitter coil.

25. An electronic identification system as recited in claim 13, wherein said second transponder coil means includes a second length of wire having a second predetermined number of turns disposed in winding relation around said core, and further wherein the ends of said second length of wire are connected to said integrated circuit device.

26. An electronic identification system as recited in claim 25, wherein the square of the ratio of said first number of turns to said second number of turns is proportional to the ratio of said first impedance level to said second impedance level.

27. An electronic identification system as recited in claim 26, wherein said first impedance level is at least six times greater than said second impedance level, whereby the voltage of said power field is stepped down and the current of said power field is stepped up when said power field is converted to said power signal.

28. An electronic identification system as recited in claim 13, wherein said high intensity field is transmitted to said transponder coil assembly at a first frequency level, and wherein said first transponder coil means is operative to self-resonate at said first frequency level so as to maximize the quantity of energy derived from said high intensity field and converted by said first transponder coil means into said power field.

29. A transponder device for receiving transmitted electromagnetic energy and transmitting a responsive signal, comprising:

a nonconductive substrate forming a support member for various components of said transponder device;

means forming a transponder circuit affixed to said substrate;

a magnetic core affixed to said substrate;

first coil means disposed in winding relation about said core and including a first number of turns, the ends of said first coil means being open-circuited; and second coil means disposed in winding relation about said core and being electrically connected to said transponder circuit, said second coil means including a second number of turns substantially fewer in number than said first number of turns, said first and second coil means being inductively coupled together and operative to collect said transmitted electromagnetic energy and provide electric power to said transponder circuit.

30. A transponder device as described in claim 29 wherein said first coil means is operative to self-resonate at the frequency of said transmitted electromagnetic energy.

31. A transponder device as described in claim 29 wherein the impedance level of said first coil means is at least six times greater than the impedance level of said second coil means.

32. A transponder device as described in claim 29 wherein said first number of turns is approximately 3800 turns and said second number of turns is approximately 500 turns.

* * * * *